June 12, 1923.
H. ADELMANN
MEAT LOAF COOKER
Filed May 24, 1921
1,458,507
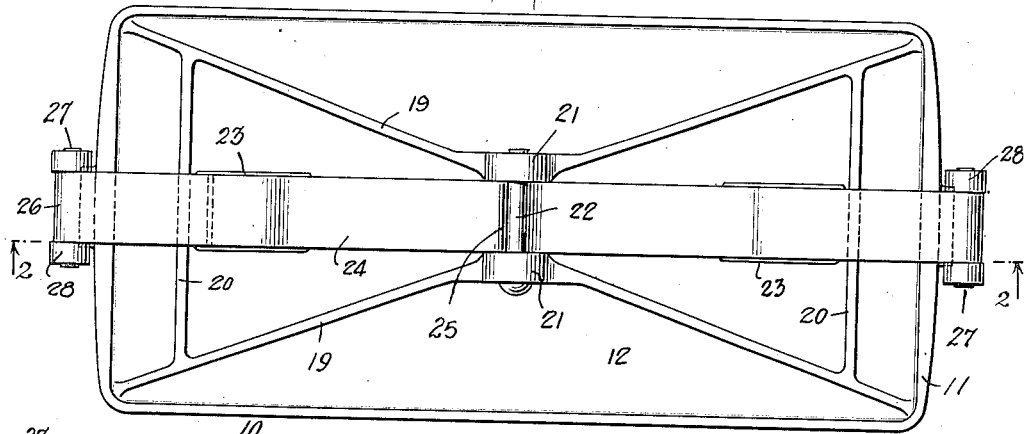
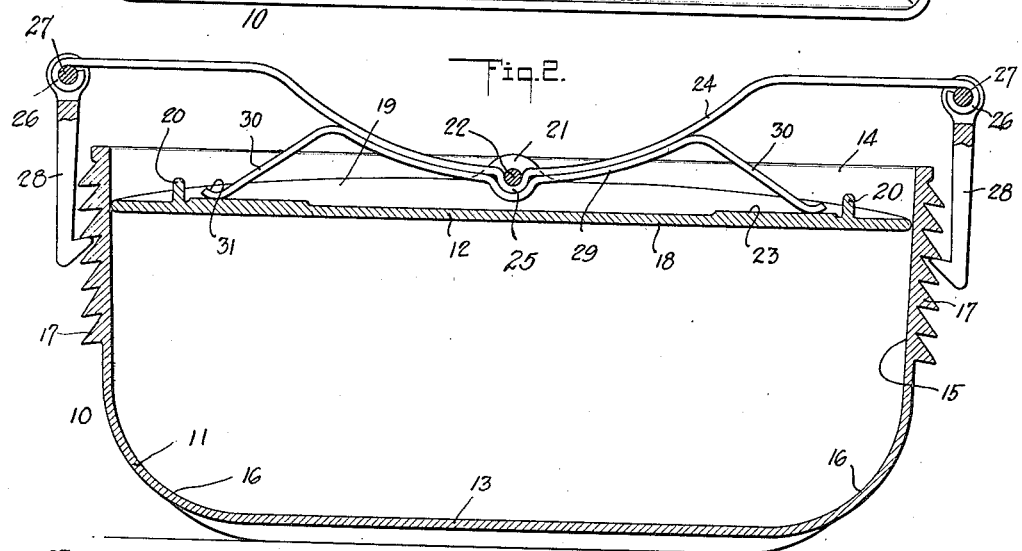
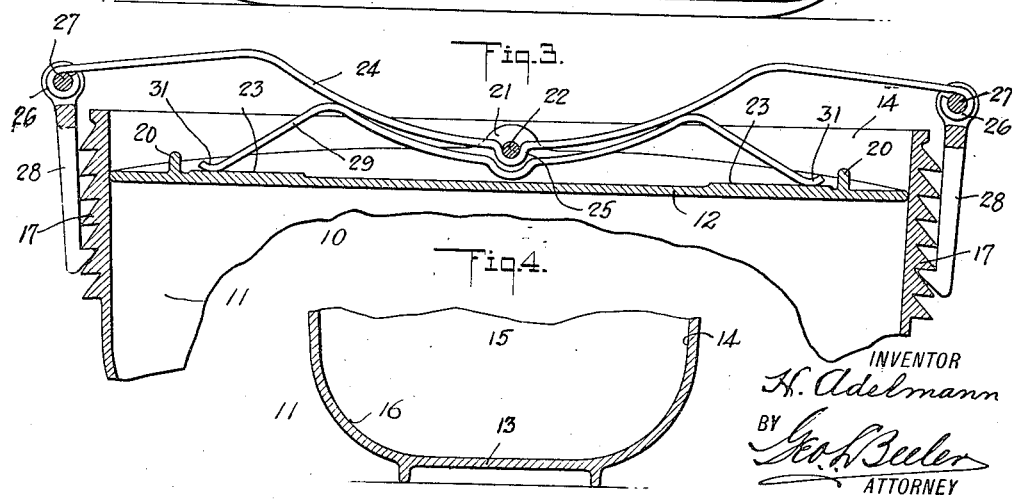
INVENTOR
H. Adelmann
BY Geo. L. Beeler
ATTORNEY Patented June 12, 1923.

1,458,507

UNITED STATES PATENT OFFICE.

HANS ADELMANN, OF NEW YORK, N. Y., ASSIGNOR TO HAM BOILER CORP., OF NEW YORK, N. Y., A CORPORATION OF NEW YORK.

MEAT-LOAF COOKER.

Application filed May 24, 1921. Serial No. 472,119.

*To all whom it may concern:*

Be it known that I, HANS ADELMANN, a citizen of Germany, residing at New York city, borough of Bronx, in the county of Bronx and State of New York, have invented certain new and useful Improvements in Meat-Loaf Cookers, of which the following is a specification.

This invention relates to meat cookers or boilers, and has particular reference to machines or devices of the same general type as covered by Letters Patent of the United States No. 1,272,883, issued on the 16th day of July, 1918, to the Ham Boiler Corp.

Among the objects of the present improvement is to provide a cooking utensil especially adapted for the cooking and formation of meat loaves as distinguished from the boiling or cooking of hams or other solid pieces of meat.

More specifically stated the present invention comprises a specially designed receptacle including a cover having a flat bottom or inner surface and with which cover cooperates a peculiar construction of cushioning and locking device serving to hold the cover resiliently in locked position with respect to the body of the receptacle during the cooking operation.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view.

Fig. 2 is a vertical longitudinal section on the line 2—2 of Fig. 1.

Fig. 3 is a view similar in character to Fig. 2 but with the cover locked within the body of the receptacle.

Fig. 4 is a transverse sectional detail showing especially the form of the bottom of the receptacle body.

Referring now more specifically to the drawings I show my improved cooking device as comprising a receptacle 10 composed of a body 11 and a cover 12. The body 11 of the receptacle is so shaped as to form a loaf which when inverted and removed from the receptacle resembles in form a loaf of bread and is one that is most conveniently and economically adapted for slicing for the making of sandwiches or the like. To this end the body 11 has a bottom, the main portion of which is flat at 13 and having flat and approximately vertical sides 14 and flat and approximately vertical end panels 15. The side and end panels, however, converge into the flat portion of the bottom at 13 along the rounded surfaces 16 whereby that portion of the loaf formed therein and which becomes the top of the loaf when delivered from the body of the receptacle has all rounded edges as shown in the detail of Fig. 4. The side and end panels are connected through relatively sharp corners, but slightly rounded, and the entire interior surface of the body is perfectly smooth. Exteriorly the body bears any suitable interlocking means such as vertical series of teeth 17 formed on the end walls.

The cover 12, acting as a follower for pressing or forming the loaf of meat, has a perfectly flat and smooth inner surface 18. The upper surface of the cover is in general flat but is provided with reinforcing ribs 19 and 20 formed integral therewith. The ribs 19 extend from the corners of the cover toward the center thereof and are arranged in two pairs, the ribs of each pair merging into a lug 21 just at the side of the center of the cover. The two lugs are provided with horizontally aligned holes for a keeper in the form of a pin 22, the lugs being spaced from each other transversely. The ribs 20 extend across the end portions of the cover parallel to the end edges and merge into the end portions of the ribs 19. Another feature of the cover is the formation on the upper surface thereof of facets 23 adjacent to the transverse ribs 20 and along the longitudinal center of the cover or in alignment with the space between the lugs 21.

A meat loaf to be most attractive and desirable should not only be well cooked and well formed but also should be nicely browned all over its surface. Under ordinary circumstances a loaf of this character put into an oven for cooking cannot be properly or thoroughly cooked and properly shaped and yet delivered with an attractive brown coating. Furthermore, the cooking of meat in a form or mold is best accomplished only under such circumstances as will not cause any of the natural juices of the meat to be expressed,—because if the juices are expressed there is not only a loss of flavor and substance of such juices but also a pecuniary loss especially noticeable when the art is practiced by concerns handling large quantities of meat.

In view of the foregoing it is essential that the cover be locked in or to the receptacle body in such a manner as to constitute an effective press or mold while at the same time the device as a whole may be handled freely when filled, for the purpose of inserting it into or removing it from the boiler or other receptacle in which a number of the cookers may be treated and yet at the same time the cover will be free to move upward to a suitable degree under the force of the swelling of the meat during the cooking operation without causing any substantial quantity of the juices to be lost. To effect this interlocking of the cover and body I provide a hanger 24 in the form of a spring of flat metal having a central downwardly arched portion and at its exact center being provided with a sharp bend 25 embracing the pin 22 whereby the hanger is held from endwise movement with respect to the cover but around which pin the hanger is adapted to oscillate somewhat. The end portions of the hanger may be substantially flat but terminating in loops 26 surrounding the pivots 27 of depending hooks 28 adapted to interlock with any desired selected teeth 17. Between the concave central portion of the hanger and the top of the cover is a resilient resistance member 29 formed also from flat spring metal, the central portion of which conforms to the shape of the adjacent portion of the hanger when in normal position as shown in Fig. 2. The ends of the resistance member are shown in the form of substantially flat legs 30 terminating in feet 31 having bearing contact with the facets 23 and located relatively close to the transverse bars 20.

In the practice of this device the body 11 is filled with the meat loaf material or other commodity to be cooked, the filling being preferably flush with the top level edge of the body. The cover is then applied and depressed moderately, the operator at this time pressing downward on the flat end portions of the hanger 24 with his hands in such position as to bring his fingers against the hooks 28 forcing them into interlocking engagement with the teeth 17 when sufficient pressure has been applied and at this time the parts will assume a position somewhat as indicated in Fig. 3. The position of the cross bars 20 is such as to limit positively the flattening of the resistance member 29 so that by no means could this member become overstrained. Ordinarily, however, the bars are spaced slightly from the feet 31 or ends of the member 29 so that while the commodity is being cooked the swelling thereof may cause the relatively upward movement of the cover without sufficient resistance to cause any substantial loss of the included juices. The end bars 20, moreover, assist in preventing any possible separation between the hanger parts and the cover when separated from the body.

After the cooking operation has progressed sufficiently the cooker is removed from the cooking receptacle or vat, and after the cover is unlocked and removed from the body the body with its contents is inverted over a platter or the like allowing the loaf to drop therefrom in the form in which it is cooked. The platter or other carrier thus provided with the loaf may then be inserted into a quick oven for the sole purpose of producing a brown surface on the loaf. Thus the loaf is produced thoroughly cooked and nicely browned, and, moreover, so formed as to provide substantially square or rectangular slices throughout its length when cut transversely. Though the slices are not exactly square they do conform substantially to the form of a slice of bread cut from an ordinary baker's loaf.

I claim:

1. In a meat loaf cooker, the combination with a body and a cover therefor movable within the top of the body and having a flat inner surface, of means to lock the cover in position with respect to the body, said cover having a transverse pivot pin carried thereby, said locking means including a hanger of spring metal provided with a central bend having free pivotal embracing engagement with said pin, and members extending from the end portions of the hanger for engagement with the ends of the body.

2. In a meat cooker, the combination with a body to receive and form the meat and a cover slidably fitted within the top of the body to complete the mold for the meat, of means to lock the cover to the body comprising a transverse pivot pin carried by the upper portion of the cover, resilient members of flat spring material extending between the pin and the cover, locking members carried by one of said members for engagement with the exterior portion of the body and another of said members bearing against the top of the cover as a resistance.

3. In a meat cooker, the combination with a body and its cover for molding the meat, of means to lock the cover and body together comprising a resilient hanger extending longitudinally of and over the cover, a resistance member located directly beneath the hanger and engaging therewith and having engagement with the top of the cover, said resistance member being in the form of a spring having its ends bearing against the cover, the cover being provided with stop means adjacent to said ends to limit the endwise movement thereof, and means carried by the cover to hold the hanger and resistance members from displacement therefrom.

In testimony whereof I affix my signature.

HANS ADELMANN.